June 26, 1934.  E. C. EBERTS  1,964,430
FRUIT AND VEGETABLE CLEANING MACHINE
Filed Dec. 2, 1931  4 Sheets-Sheet 2
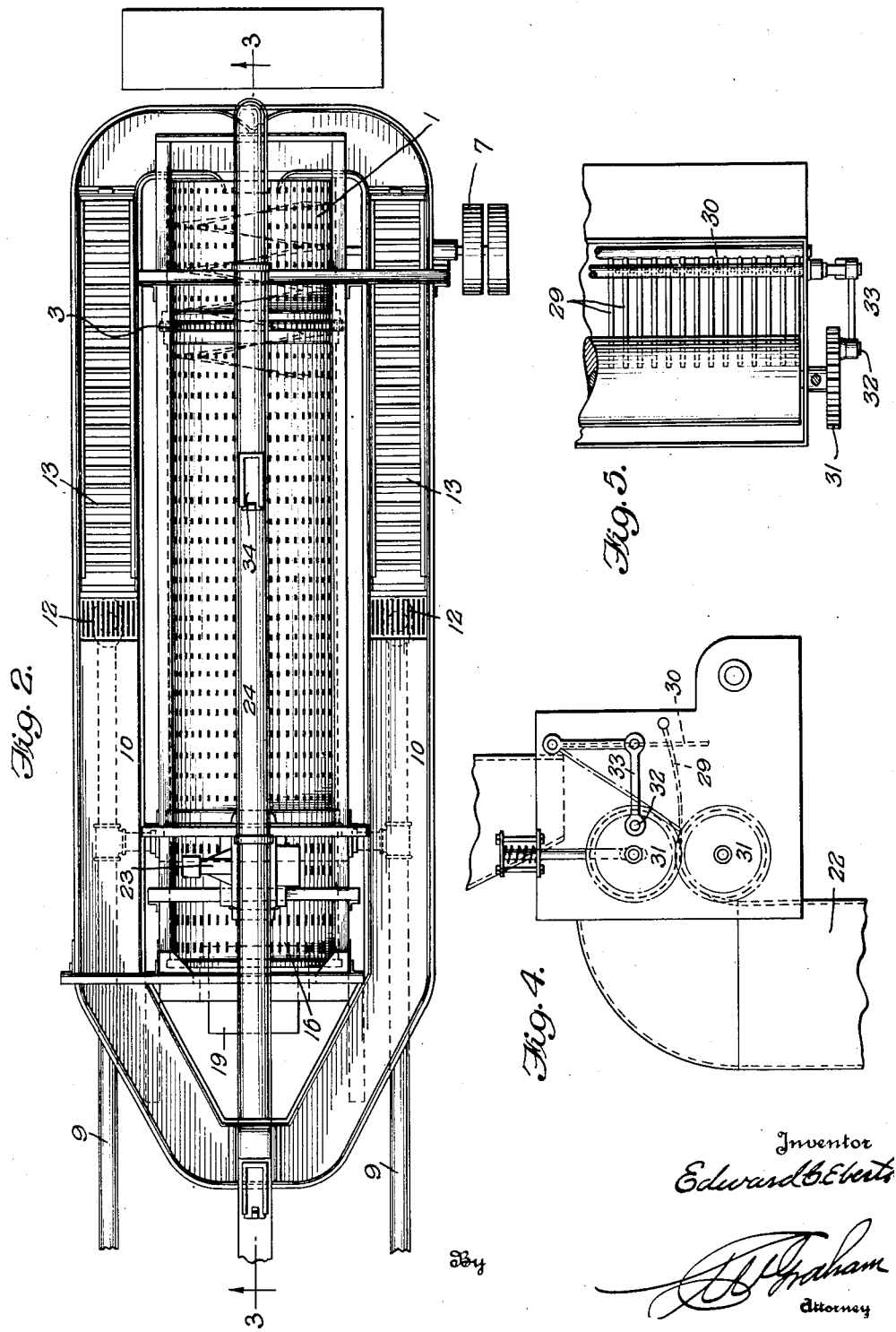

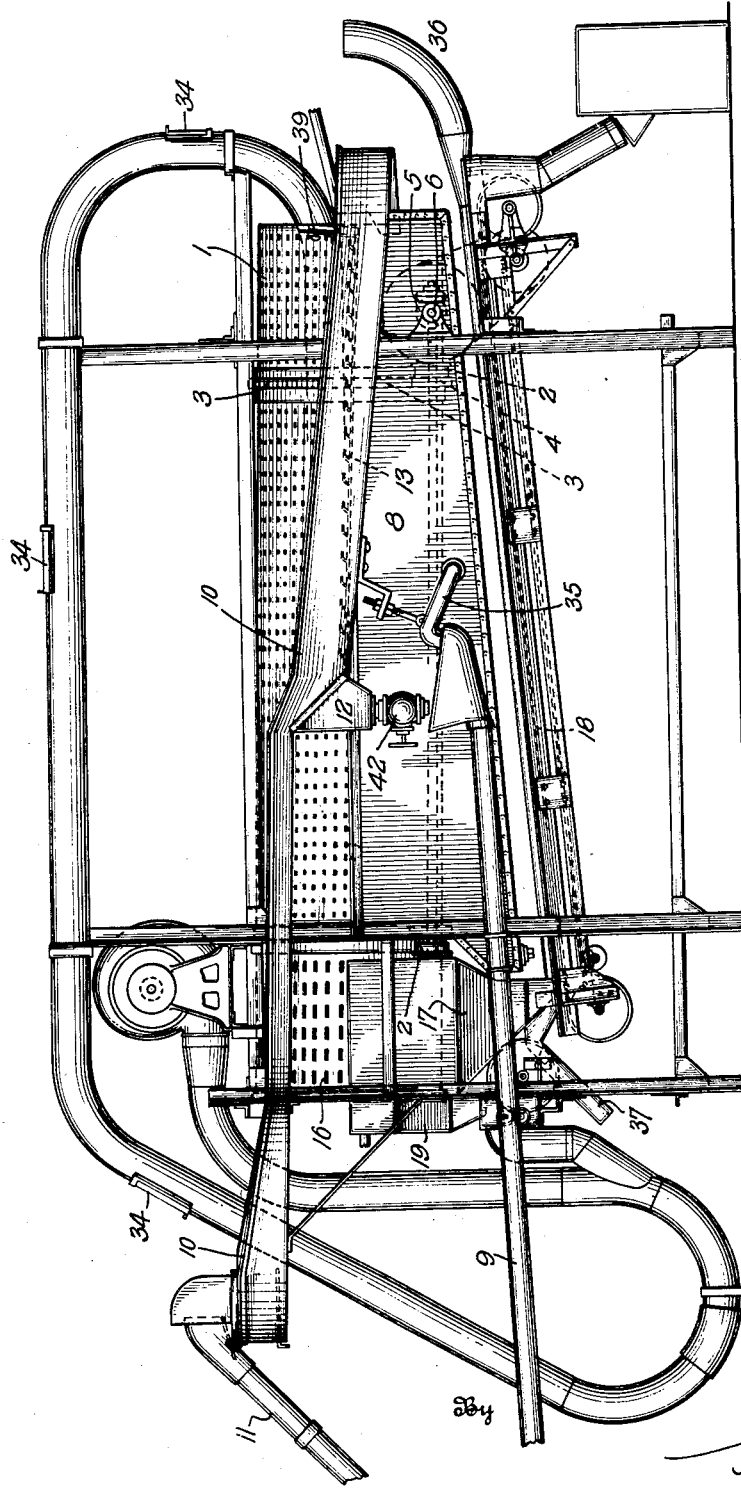

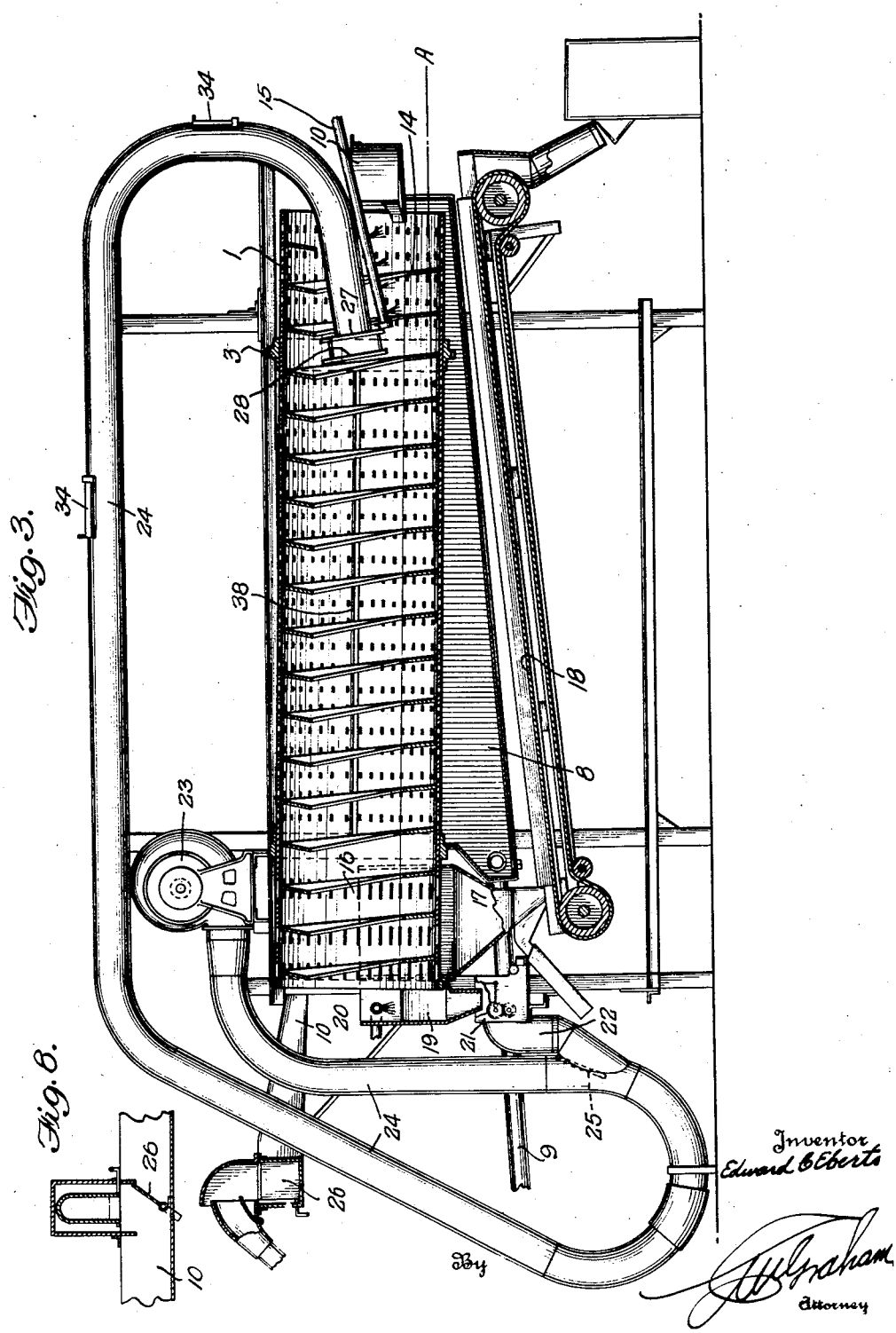

June 26, 1934.   E. C. EBERTS   1,964,430
FRUIT AND VEGETABLE CLEANING MACHINE
Filed Dec. 2, 1931   4 Sheets-Sheet 4
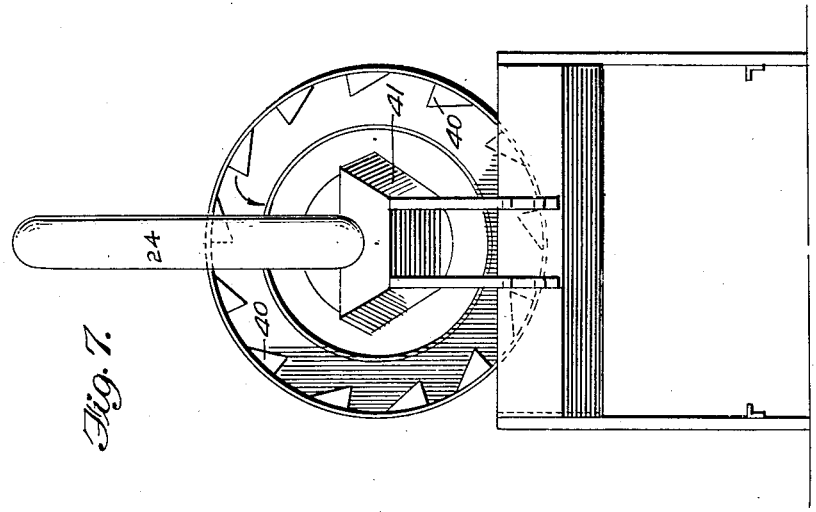
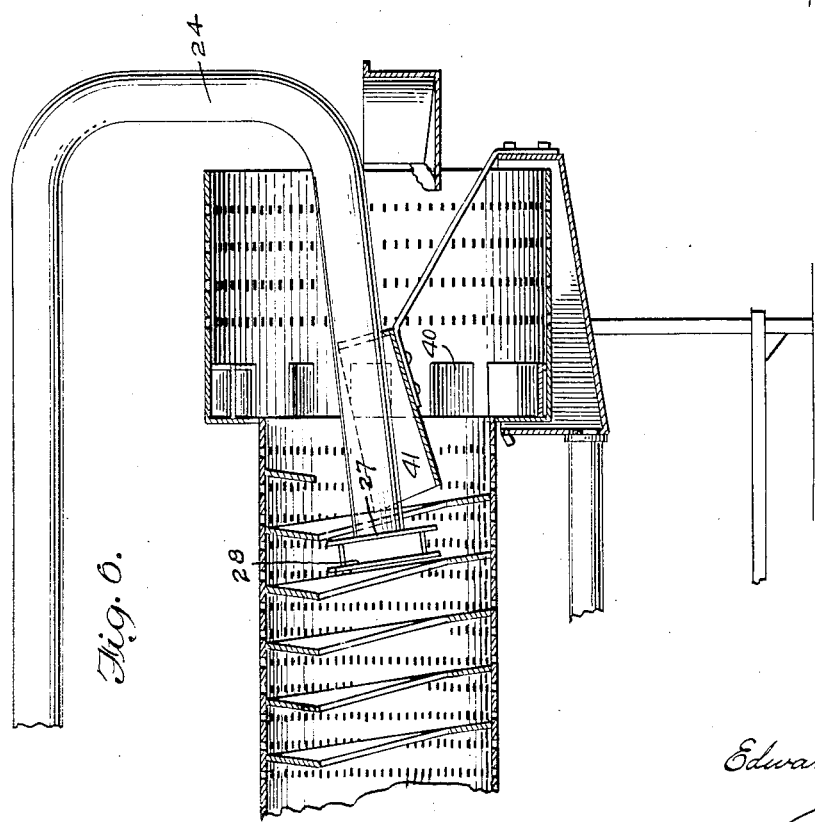

Patented June 26, 1934

1,964,430

UNITED STATES PATENT OFFICE 1,964,430

FRUIT AND VEGETABLE CLEANING MACHINE

Edward C. Eberts, Jeffersonville, Ind.

Application December 2, 1931, Serial No. 578,589

12 Claims. (Cl. 146—194)

This invention relates to an improved method and apparatus for cleaning natural and acquired undesirable residue and materials from the surfaces of vegetables of various kinds as well as fruits and other materials adapted to be cleaned in the manner to be described and it is particularly adapted to the cleaning of peas and beans and any other product of a like nature.

Referring to peas and beans and the like as treated by this method and apparatus applicant wishes to call attention to certain characteristics of natural growth of plants of this nature, that have a very great bearing on the facility of properly cleansing these food products and that also have a considerable bearing on the flavors finally sealed in the can as offered to the consuming public.

The insides of the pods of plants of this nature are provided with a mucilaginous substance or membrane, which together with the juices of the pods and vines that are released during the threshing operations, seem to more or less envelop the individual peas and beans and thus coat them with a somewhat sticky exterior to which dust and other débris adhere during their handling and preparation for canning.

The usual methods now employed for cleaning this material from the product, is a rinsing in water, either heated or cold, which removes much of the loose material, but it is not until the product reaches the blanching step that the most of this undesirable material is removed, and even here, it is not fully removed, but enough adheres and is carried along with the product to very materially affect the natural flavor and aroma of the product, and sufficient to very materially discolor the liquor in which the product is immersed when it is finally sealed in the can.

The excessive heat usually required in the blanching water to remove as much of this adhering matter as possible has a more or less deleterious effect on both the flavor and color of the product, since this heat causes the product to be more absorptive and it thereby acquires unnatural flavors that heretofore have been almost impossible to avoid. This is due more or less to the pollution of the blancher water which gradually becomes laden with this mucilaginous matter and other dirt and débris so that the hot and expanded product cannot help but absorb more or less of this undesirable material.

An examination of the blancher overflow will readily disclose that the liquid is slimy and milky due to the materials removed from the surface of the product and the absorption of this slimy and milky substance is what degrades the flavor and quality.

My discovery consists in placing a quantity of small sponges or a like material that is more or less absorptive and which will have a slight and gentle scrubbing action on the product while being agitated with the product which will have the effect of gently rubbing each separate pea or bean in the mass and thus removing the last vestige of the adhering matter, and on account of the absorptive quality of the sponges this residue of adhering material is absorbed and carried out of the mass of product with the sponges, so that the wash water, or the blanching water remains very much cleaner than has heretofore been possible with the old manner of blanching under excessive heat.

The quantity of sponges required compared to the mass of product has been found to be substantially double in bulk, but this proportion may vary within quite wide limits according to operating conditions and the kind of product being handled.

The sponges in size are preferably about the size of hen's eggs when treating the smaller products such as peas and beans but would naturally be larger when treating a larger product, or under some conditions if sponges were not used the material may be of any relative size. The point being to provide a sufficient quantity of the sponges or other material suitable for the purpose, that will give the desired degree of scrubbing action within the operative space available, and when cleaning the surface residue from hard skinned product such for example as apples or other fruits the abrasive action of the scrubbing material may be increased to the point just short of doing damage to the fruit and thereby getting the maximum cleaning effect in the shortest time.

The operation of cleaning fruits and vegetables by this method and apparatus is continuous, in that a constant stream of fruit or vegetables is moved through a rotary washer comprising a relatively long cylinder with perforated walls for at least a part of its length, and in some instances for the whole of its length, which may be inclined so that the receiving end will be immersed in washing fluid, or it may have an enlarged end portion that will dip in washing fluid and the balance of the cylinder be unsubmerged in either instance.

Fresh and cleaned sponges or other material are fed to the inlet end of the cylinder where they immediately mix with the product which is rolled over and over by the rotation of the cylinder, and by means of a spiral member located along the inner surface of the cylinder the mixed mass is gradually moved along the inclined cylinder while being lifted and dumped back to the bottom surface of the rotating cylinder. This mixing of the sponges and material and the agitation produced by the movement of the cylinder causes the sponges to quickly and effectively absorb the adhering residue from the material being treated.

When the sponges and product reach the exit end of the cylinder the sponges are separated from the material by means of perforations in this end of the cylinder that will permit the passage of the product but retain the sponges and tail them out over the end of the cylinder where they drop into a washer where they are thoroughly rinsed and are then passed through a wringer and the moisture squeezed out, and by means of a blower and suction system are conveyed back to the inlet end of the cylinder for reuse.

In treating peas or beans or like materials they are first passed through a washer that removes all loosely adhering matter as well as pieces of pods, some split peas or beans and any other matter that is easily washed out of the mass. Also in passing the washed product to this apparatus it is passed over riffles in the presence of a liquid which further washes and cleanses the mass and also has a tendency to produce a rough separation of the mass according to size due to the difference in specific gravity or to size alone, so that when the product reaches the inlet end of the cylinder of the present apparatus it is well cleaned in the ordinary sense and only carries the closely adhering mucilaginous material mentioned which the sponges remove.

The sponges being comparatively dry and highly absorptive when they first mix with the product they quickly absorb any excess moisture carried thereby so that when the product is discharged from the cylinder it is comparatively dry. It is discharged on an open conveyor belt and may be subjected to an air blast of air, warmed if desirable, which tends to finish the drying and deliver the product to the next operation in a practically dry state which very greatly enhances the subsequent operations since there is no tendency whatever for the product to stick together by capilarity, and none of the polluted wash water is carried by the product to the next steps in preparing the product for canning.

It is therefore, an object of the invention to provide a new and improved method and apparatus for cleansing fruits, vegetables and other materials of accumulated débris from their outer surfaces.

It is also an object of the invention to provide a method and apparatus for cleansing fruits and vegetables wherein an absorptive material is intermixed with the product to be cleansed in the presence of a liquid and the mass agitated to produce a cleansing and scrubbing action to cleanse the material.

It is a further object of the invention to provide a method and apparatus for cleansing fruits and vegetables wherein a continuous stream of product are passed through a predetermined path and an absorptive scouring means intermixed therewith through a portion of the path to cleanse and scour the material.

It is also an object of the invention to provide a method and apparatus that will separate the cleansing and scouring material from the product, remove the absorbed moisture and débris and return the material for reuse.

It is also an object of the invention to provide a method and apparatus for cleansing material wherein a quantity of small sponges are mixed with the product and agitated therewith to produce a scouring and absorptive action on the product.

It is also an object of the invention to provide a method and apparatus for cleansing fruits or vegetables wherein an abrasive and absorptive material of larger individual size is added to the product and mixed therewith and moved along a predetermined path while being agitated to thereby cleanse the material of surface accumulations.

It is a further object of the invention to provide an apparatus for cleansing a food product wherein the product is moved continuously through a rotating cylindrical member, giving a preliminary washing or rinsing to the product, mixing sponges therewith and agitating the mixed mass while passing it through said cylinder, separating the product from the sponges, cleansing and partially drying the sponges and returning them for reuse.

It is a further object of the invention to provide an apparatus for cleansing a food product wherein the product is floated along a pathway where it is subjected to a riffling operation to separate undesirable material therefrom, then passed into a rotary inclined cylinder and moved in the presence of a scouring material and a liquid to receive a surface cleaning therefrom, then separating the product from the scouring material and passing it through subsequent operations.

It is also an object of the invention to provide an apparatus for cleansing a food product wherein the product is subjected to a scouring operation in the presence of a liquid and a scouring material, separated from said scouring material and subjected to a drying operation.

It is also an object of the invention to provide an apparatus for cleansing a food product wherein the product is mixed with a scouring material softer than the product and which is also absorptive then separating the product from the scouring material, cleansing the scouring material and returning it for reuse.

It is also an object of the invention to provide an apparatus of unit construction for cleansing a food product wherein the entire operative mechanism is self contained and carrying suitable adjustments and controlling means for properly handling and directing any product that is adapted to be handled with the apparatus.

With such objects in view as well as other advantages inherent in the invention, the novel structural peculiarities, novel organization of elements, and the separate and collective operations involved in carrying out the recited objects of my invention, which will be made the subject matter of claims, it is understood that the several necessary elements and combinations constituting the same may be varied in their proportions, placement, general arrangement and operative relations without departing from the scope and nature of the invention.

In carrying out the objects of the invention in a concrete form or machine, further objects, advantages and improvement have been evolved than have been enumerated, and in order to make the invention more clearly understood there are shown in the accompanying drawings means and mechanism embodying the preferred structural arrangement and the preferred disposition of the different parts and combinations, in which I have illustrated only one way of embodying the creative part or concept of the invention. The described devices are simply embodiments of the invention which other structures might also employ and some of the parts and combinations of parts may be used without the others in different types of such machines without departure from the purview of the invention and I therefore regard myself as entitled to such variations from the shown and described devices as fall within the scope and meaning of the claims hereto appended.

Before proceeding with a description of the drawings applicant wishes to point out that while the machine disclosed embodies the preferred structural features and arrangement at the same time the drawings are not necessarily drawn to scale and they do not necessarily follow the best engineering practices in the structural features; and some of the parts may be exaggerated in relative size or placement to better illustrate the inventive concept.

Figure 1 is a side elevation of the complete machine.

Figure 2 is a plan of Fig. 1.

Figure 3 is a vertical sectional elevation taken on substantially the line 3—3 of Fig. 2.

Figure 4 is a detail of the sponge wringing device.

Figure 5 is a detail of the swinging comb device for feeding the sponges into the wringer.

Figure 6 shows a modified construction of the feed end of the perforated drum which shows an enlarged end dipping into a liquid for preliminary washing purposes and with means for elevating the product and dumping it into the perforated section of the cylinder.

Figure 7 is an end view of Fig. 6.

Figure 8 is a detail of the entrance to the sluiceway showing the switch gate whereby the stream of material may be divided to pass equally into both sluiceways or all diverted to either side.

A simple frame work supports the entire mechanism and converts it into a unitary device that is self contained and occupies the minimum of floor space.

Mounted longitudinally through the center of the frame work is a relative large cylindrical member 1, mounted on rollers 2, best shown in Fig. 1, and is given continuous rotation by means of the ring gear 3, driven through the pinion 4 shown in dotted lines in Fig. 1, the bevel gears 5, shaft 6 and pulleys 7.

In the drawings the cylinder 1 is shown slightly inclined but it may be mounted straight if desired although the drainage is somewhat best if inclined. The cylinder is also shown as having perforations the entire length. This feature may also be varied as necessity may indicate with different products.

A water pan 8 is located directly under the major portion of the cylinder 1 to catch the water passing through the perforations and is connected to drain pipes 9 which carry the water back to the tank for cleaning and reuse.

A sluice way 10 receives the product to be treated from an elevator 11 which may be a water elevator which overflows into the entrance to the sluiceway thereby depositing both product and water which carries the product down the sluiceway over a screening section 12 and then over cleaning and separating riffles 13, which clean and separate the material and pass the product on through the sluiceway to the point of discharge into the cylinder 1 which deposits the product into the end of the rotating cylinder where it is picked up by the screw conveyor 14 and moved along the cylinder, to the point of exit. A spray pipe 15 serves to spray clean water on the product just as it enters the cylinder which wets it thoroughly, washing off any adhering débris and placing it in proper condition for the treatment by the sponges.

A suitable supply of sponges of proper size and quantity for the product being treated are initially placed in the feed end of the cylinder where they will mix with the product and begin their treatment thereof through the agitation imparted to the mixed mass of product and sponges by the constant rotation of the cylinder 1. After the sponges and product reach the exit end of the cylinder 1 the sponges are separated from the product by means of the large perforation 16 which allows the product to sift through into the funnel 17 and pass onto the conveyor belt 18 which carries the product on to the next treatment.

The perforation 16 will not pass the sponges which will tail off the cylinder end and drop into the funnel member 19 where they meet a water spray 20 which wets them and tends to wash off some of the débris washed and rubbed off the product during its passage through the cylinder. Here the sponges drop into the zone or the wringers 21 where they are squeezed substantially dry and passed into the conduit 22. A blower 23 located on the top of the unit conveys air through the conduit 24 which has a restriction 25 at its union with the conduit 22 to produce a strong suction at this point which will have the effect of pulling the sponges into the conduit 24 and carry them back to the entrance of the cylinder 1 for intermixing with the product and for reuse.

The foregoing description has given some of the details of structure and operation so we may now pass directly to an operative description of the apparatus which will disclose other details of structure and operation not yet disclosed.

Operation

In describing the operation of this device in further detail we will suppose the product being handled is peas or beans since these two products will receive substantially the same treatment in their passage through the machine.

Peas or beans receive a preliminary treatment or washing in a machine that forms the subject matter of a copending application Serial No. 536,948 filed May 12th, 1931, and which delivers the product to the conduit 11 wherein is flowing a stream of water with a force sufficient to carry the product along with the stream and wherein the product and water will deposit into the sluiceway 10, and if the switch gate 26 is set in a vertical position the product and water will distribute substantially evenly into each side of the sluiceway and together flow down the sluiceway and pass over the screens 12 which will drain a part of the water away from the product which water will pass into the drain pipe 9 and be conveyed back to the first washing tank for cleaning and reuse. The product now separated from the water passes on over the riffles with such water that did not drain away where a further separation and preliminary cleaning takes place since some of the débris still adhering to the product will be caught by the riffles 13 and detained, the riffles being taken out frequently and cleaned. There is also some separation of product along the riffles such as heavy or mature particles may also remain in the riffles, but the product generally passes from the riffles to the end of the sluiceways where it drops into the end of the cylinder 1 and is engaged by the screw conveyor in the cylinder and gradually moved along the cylinder.

When the machine is first started sponges in sufficient quantity are gradually added to the stream of product until the sponges have passed entirely through the cylinder and begin to return through the conduit 24, when a sufficient quantity of the sponges will be in the system so that the new and continually passing stream of product will always find a sufficient number of sponges in the cylinder to give the proper and desired treatment.

The product is delivered just inside of the end of the cylinder 1 while the sponges are delivered a short distance beyond the end so that when the sponges fall into the product it will be in the control of the screw conveyor and the proper mixing of the sponges and product will be quickly accomplished. The end of the conduit 24 entering the cylinder 1 is provided with baffle plates or disks 27 and 28. The force of the blower driving the sponges first against disk 28 from which some will fall and others rebound back against disk 27 when they too will fall into the mass of product. If it were not for the baffles 27 and 28 the sponges would be blown too far into the cylinder. Another reason to deliver the sponges farther into the end of the cylinder 1 is to carry them beyond the sprays from the pipe 15. If this spray water was to fall on the sponges they would become too wet for best results. The sprays thoroughly wet the product so that when it meets the sponges it is just wet enough to give up some moisture to the sponges in the scrubbing action, the sponges absorbing the bulk of the moisture carried on the surfaces of the product and at the same time scrubbing off the adhering mucilaginous matter and dirt incorporated therewith, the sponges actually reaching into the eye cavities of lima beans and the like and cleaning them quite effectively. As the mass of sponges and product reach the end of the cylinder 1 the product will have been thoroughly cleaned of the undesirable matter and will pass through the large openings of the end of the cylinder and drop into funnel 17 and onto conveyer 18 which carries them to a place of deposit for further treatment. The travel over this conveyor gives the product time to dry somewhat so that by the time they are discharged they are practically surface dry so that subsequent operations are much facilitated thereby. The sponges being unable to pass through the perforations 16 are tailed over the end of the cylinder carrying the accumulations of débris and the mucilaginous matter scrubbed off of the product into the funnel member 19 where they intercept the water spray 20 which saturates them with moisture and tends to wash out much of the accumulated débris.

The sponges now fall onto the grating shown in enlarged detail in Figs. 4 and 5, this grating 29 comprises a series of bars spaced enough to let débris pass but to retain the sponges. A constantly oscillating comb moves over the grating indicated at 30, the points of the comb moving below the line of the grating bars 29. This movement of the comb sweeps the sponges into the wringer rollers, which are of soft rubber as at 31, which squeezes out substantially all of the water and passes the substantially dry and cleaned sponges into the conduit 22 which connects with the conduit 24, into which they pass by means of the suction created at the baffle 25 and are returned to the feed end of the cylinder 1 for continual reuse. The comb 30 is oscillated by means of the crank pin 32 and the connecting link 33.

Hand holes are provided along the conduit 24 for cleaning or for relieving any obstruction that may occur by a bunching of the sponges, as shown at 34.

There may be times when the quantity of product is insufficient to separate and run through both sluiceways in which case the switch gate 26 may be set to either side and thus divert the flow of product in either direction.

It has been mentioned that the cylinder 1 is slightly inclined and that the tank 8 is located thereunder to catch all drip water therefrom. This tank is also for another purpose in that it supplies a bath of water for the feed end of the cylinder to dip into so that the product and the sponges may be agitated in the presence of water for more thorough cleaning of some product. With the water level up to the line "A" Fig. 3 the tank will be submerged to a considerable portion of its length. It is understood of course that the level of water may be regulated to suit operating conditions. This is accomplished by an overflow device on the side of the tank 8 which may be adjusted to change the level of liquid in the tank.

The overflow control 35 is mounted to swing on its connection with the tank 8 so that the mouth may be lowered or elevated to thereby raise or lower the level of water in the tank 8.

It may be lowered so that the cylinder will not be immersed in liquid at all as has been mentioned or it may be elevated to raise the liquid in the tank 8 to substantially the line "A" in which case the cylinder will be somewhat submerged so that the product mixed with the sponges will be in a bath of water for a portion of the time of their travel through the cylinder.

A blower, not shown, may be connected to the conduit 36 Fig. 1 which will direct a blast of either hot or cold air to the funnel member 17 which will have the effect of blowing out of the stream of falling product, skins, broken particles of product and other débris that may have developed in the scrubbing action. This air and débris will pass out of the chute 37, which also collects and passes the wash water falling from the sprays 20 together with the dirt and residue washed thereby from the sponges.

A series of angle irons, one of which is shown at 38 Fig. 3, may be spaced around the interior of the cylinder 1 of sufficient height to pick up the product but not the sponges, and lift the product and let it fall onto the sponges as the cylinder rotates which will give a very rapid and effective cleaning effect as the product will gradually sift down through the mass of sponges and thereby come into contact with more sponge surface than otherwise.

Some mention should be made of the product produced by this apparatus since at no time in the past has such a product been available to the canner and consuming public.

In the ordinary methods of preparing products of this type for canning there was no known way of removing all of the mucilaginous material mentioned with its adhering dirt and débris. Recourse was had to hot blanching which has been mentioned but this excessive heat always degrades the product more or less and never has removed all of the undesirable matter. The liquor forming a part of all canned peas and beans has always been more or less cloudy and only since the development and installations of this piece of apparatus has it been possible to can peas and beans with a perfectly clean liquor, because this apparatus removes all of the material that causes cloudy liquor.

The material removed from the peas and beans by this device is a thick slimy and bitter product, and it is almost unbelievable that this slimy and bitter material has always been canned with the peas and beans and since its removal the product assumes a new flavor and color in the can and gives to the consuming public a very much superior and cleaner product than has been possible before.

This manner of cleaning peas and beans has developed other advantages in the further handling of the product. The free moisture having in large part, been absorbed by the sponges while they are mixed with the product, leaves the product comparatively surface dry which greatly increases the capacity of graders since there is no capillarity between the particles of the product and therefore no tendency for débris, skins and splits to stick to the perfect particles, and since the product is not wet handpicking is eliminated and instead the product may be separated by means of aspirators which are more sanitary and make a more perfect separation of product and débris.

It has been mentioned that a certain separation of product takes place in the riffles 13. When treating lima beans it has been found that the large white beans in the mass will gradually collect in the riffles, crowding out the smaller and green beans so that when the riffles are removed for cleaning or otherwise these white beans may be salvaged which eliminates just so much hand picking. In order to have the riffles act as separators in this sense it is desirable to adjust their inclination so that the current flow is not too swift to carry the heavy beans over the riffles. Adjustment is accomplished through the medium of the adjusting bracket 39 which is held in adjusted position with a suitable thumb nut, the riffles lying losely on this bracket so they may be lifted out for cleaning without difficulty. It has been found that only a slight pitch facilitates the separation of the large white beans from the mass of material passing over the riffles.

In handling peas there is also a separation of the hard peas from the mass which are recovered in the same manner as the white lima beans.

Referring back to where mention was made of the blower conduit 36, it should have been added that the space over the belt 18 is enclosed and forms the extension of this conduit so that the air, either hot or normal, passes over the product carried by the belt 18 with the result that the last vestige of moisture is dissipated by the time the product reaches the end of the belt. From this point on the product is substantially dry, while in all former methods of treating these products they have been more or less wet and much harder to handle in the subsequent operations.

Figures 6 and 7 show modifications of the receiving end of the rotary cylinder wherein the receiving end of the cylinder is enlarged and is adapted to dip in a bath of water for a preliminary washing of the fruit or vegetables before mixing them with the sponges for the cleaning proper. This view is more or less skeletonized and is simply intended to show how the end of the cylinder would be made and applied to the machine of the other views. The product is delivered to the enlarged portion of the cylinder by means of the same sluiceways and is then rolled around and is picked up in the pockets 40 and dumped into the chute 41 from which it runs into the cylinder and is there mixed with the sponges as has been described. The enlarged end of the cylinder permits a much smaller water tank and permits the cylinder to be mounted horizontal instead of being inclined as in the other views. This also permits a substantially dry operation of scrubbing in that only the moisture carried by the product will be present with the sponges.

It should also be mentioned that the valve 42 in the overflow pipe system 9 provides an easy means for adjusting the amount of water to be separated from the material as it passes over the screen 12 in the sluiceways. By opening or closing this valve more or less of the passing water will leak away in the drain, which of course carries more or less of residue and débris therewith.

In the cleaning and treating of fruits of various kinds the present apparatus is especially suitable, the only changes that may be necessary in the structure is, size, that is the various parts and elements should be made to handle the particular fruits being treated in substantially the manner described for peas and beans.

Considering for example the cleaning of apples for the removal of spray residue or the like, present practice requires pumps of high pressure, many times made of rubber or other non-corrosive materials which are very expensive and wear rapidly. The machine disclosed herein, operated with the proper size of sponges or other absorbent material that will act as a scouring medium and will absorb moisture and residue from the fruit, requires no expensive pumping arrangements and no pressure other than normal in water systems.

The fruit to be treated could have applied a preliminary washing step if desirable and could be conveyed similar to the manner disclosed for the small vegetables and could be handled in substantially the same manner, or if slight changes in operation required a different manipulation of the product I consider that the same would fall within the scope and meaning of the claims.

The sponge cleaning method is very effective in reaching into the stem and blossom ends of the fruit and scouring out the entrapped residue, and with proper washing with suitable solutions the fruit is delivered to the packers fully dried and in perfect condition for the consumer.

Oranges, lemons, grapefruit, berries, nuts, and in fact any product that requires a scouring cleaning operation can be handled in a properly adjusted and adapted apparatus such as is disclosed in this application.

Applicant's copending application 536,948 filed May 12, 1931 is companion to this application and covers the methods and process of cleaning fruits and vegetables by the use of freely moving cleaning units, preferably sponges.

What I claim as new and desire to secure by Letters Patent is:

1. An apparatus for cleaning and treating peas and beans by means of a mass of freely moving sponges consisting in providing a rotary screening member, means for delivering peas or beans and sponges to said screening member, means for rotating said member to agitate said mixed mass, and cause the product to percolate through the mass of sponges, means for providing a liquid to contact with said mass, means for separating the product from the sponges, means for cleansing the sponges and other means for returning the sponges to the stream of peas or beans for reuse.

2. An apparatus for cleaning and treating peas and beans or the like by means of a mass of freely moving sponges comprising a sluiceway through which a stream of peas and water may flow, means for supplying a source of water, screening means along said sluiceway to separate débris and some water, riffle means along said sluiceway for affecting a further separation of débris from said peas or beans, means for discharging the product, a rotary screening means for receiving the product, means for delivering a constant stream of freely moving sponges to the product in said rotary screening means, means for conveying the mixed mass through said rotary screening means, means for separating the sponges from the product, means for cleaning the sponges and returning them to the rotary screening means for reuse.

3. An apparatus for cleaning peas and beans or the like by means of a mass of separated and freely moving sponges comprising a rotary cylinder, means for rotating the cylinder, a screw conveyor in the cylinder, lifting means in the cylinder, means for delivering a constant stream of peas or beans to said cylinder, means for mixing the mass of sponges or the like to said stream of peas or beans whereby the mixed mass will be conveyed through said cylinder and agitated and remixed, so the product will percolate through the mass of sponges, means for separating the sponges from the product, means for squeezing the moisture from the sponges and air blower means for returning the sponges to the stream of product for reuse.

4. An apparatus for cleaning a granular material comprising means for moving a granular material through a predetermined path, means for mixing a mass of separated and freely moving sponges with said granular material, means for agitating the mixed mass, means for supplying a liquid to contact with said mass to facilitate the cleaning and assist the granular material to percolate through the mass of sponges to be scrubbed and cleaned thereby, means for separating the absorbent material from the granular material, means for passing the granular material through a further treatment and means for cleansing said absorbent sponges, and air blower means for receiving and delivering said cleaned sponges to the stream of granular material for reuse.

5. An apparatus for cleaning and treating fruits or vegetables by means of a mass of separated and freely movable sponges comprising a rotary cylinder, means for rotating said cylinder, means for inclining said cylinder from the horizontal, means for delivering fruits or vegetables to the lower end of said cylinder, means for delivering sponges to the lower end of said cylinder, means for engaging said mass and moving it axially through said cylinder toward the elevated end, means at the elevated end for separating the fruits or vegetables from the sponges, means for receiving the sponges, spray means for washing the sponges, wringer means for pressing the moisture from the sponges, air blower means for receiving the cleaned sponges and delivering them to the lower end of said cylinder for reuse.

6. An apparatus for cleaning and treating fruits or vegetables by means of a mass of separated and freely moving sponges comprising a rotary cylinder mounted in an inclined position, means for rotating said cylinder, means for delivering a stream of fruits or vegetables to the lower end of said cylinder, means for moving said fruits or vegetables axially through said cylinder to the elevated end thereof, means along the path of movement for lifting the fruits or vegetables and dropping them on the mass of sponges so they will percolate therethrough, means along the path of movement for supplying a liquid to contact with the fruits, vegetables and sponges during the cleaning of the fruits and vegetables, means for separating the sponges from the fruits or vegetables, means for washing the sponges to remove accumulated débris therefrom, means for wringing and pressing the moisture from said sponges, air blower means for receiving said sponges and returning them to the stream of fruits or vegetables for reuse.

7. An apparatus for treating and cleaning fruits and vegetables by means of a mass of separated and freely moving sponges comprising a unitary device consisting of a rotary cylinder, sluiceways along the sides of the cylinder for delivering material to said cylinder, a water tank under said cylinder, means for controlling the water level in said tank so the bottom of said cylinder may be submerged or not, means for passing fruits or other product into the end of said cylinder, means for delivering a mass of freely movable sponges, into said cylinder with said product, means for moving said mixed mass axially through said cylinder, means for agitating and mixing the mass during passage to cause the product to percolate through the mass of sponges, means for separating the sponges from the product, means for passing the product to another treating means comprising a conveyor and an air conduit with means for moving hot or normal air through said conduit to dry said material.

8. An apparatus for cleaning and treating fruits or vegetables by means of a mass of separated and freely moving sponges comprising a cleaning means consisting of a rotary cylinder and an agitating and conveying means within said cylinder, means for supplying a liquid to the inside of said cylinder, means for delivering fruits or vegetables and a quantity of sponges to the inside of said cylinder, means for rotating said cylinder to cause an axial movement of the mixed mass therethrough whereby the fruit will percolate through the mass of sponges and the sponges will rub and scour the fruits or vegetables and remove and absorb undesirable material therefrom, means associated with said cylinder for separating the sponges from the fruits or vegetables after the cleaning is accomplished, means for washing the sponges and conveying means for returning them to the stream of fruits or vegetables for reuse, means for receiving the treated fruits or vegetables and moving them through a zone of drying medium, with means for supplying a drying medium to said zone.

9. An apparatus for cleaning fruits or vegetables by means of a mass of separated and freely moving sponges comprising a rotary cylinder, an enlarged end on said cylinder, a tank for liquid under said enlarged end whereby it dips in liquid therein, means for delivering a stream of vegetables to the enlarged end of said cylinder, means for elevating said vegtables and depositing them into the smaller portion of said cylinder, means for delivering a stream of sponges to the smaller portion of said cylinder to mix with said vegetables, means for moving said mass axially of said cylinder and agitating them during their movement therethrough, means for separating the sponges from the vegetables, means for cleaning the sponges and means for returning them to the stream of vegetables for reuse.

10. An apparatus for cleaning and treating fruits and vegetables by means of a mass of freely moving and separated sponges, comprising a rotary screening and agitating member, means for rotating said member, means for delivering a constant stream of product to said rotary member, means for delivering an endless continuously moving stream of separated and freely moving sponges to said rotary member to mix with said product and act as a cleaning means therefor, the individual size of the sponges being greater than the pieces of product, means for supplying cleaning liquid to contact with said sponges and product, means associated with said rotary member for lifting the mixed mass of product and sponges and rolling them over to thoroughly mix and agitate them so the product will percolate down through the interstices between the sponges to be cleaned and scrubbed thereby with means at the end of said rotary member for separating the product laterally from the sponges and cleaning the sponges for reuse.

11. An apparatus for cleaning and treating a vegetative product or the like by means of a mass of freely moving sponges comprising a rotary elongated screening and agitating member, means for delivering a constant stream of product to one end of said screening member, means for moving said product through said member in a tortuous path, means for delivering a stream of freely moving sponges to one end of said screening member to mix with said product and to act as a scouring and cleaning agent, enlarged openings at the other end of said screening member to separate the product from the sponges, means below and beyond said screening member for receiving the sponges and to cleanse from them the absorbed impurities with air propelling means for returning the cleansed sponges to the entrance end of said screening member for reuse.

12. An apparatus for treating peas or beans comprising a rotary treating means, means for delivering a constant stream of peas or beans to said rotary treating means, other means for delivering a mass of separate and freely moving sponges to said rotary treating means, means for supplying a liquid to contact with said streams of peas or beans and said mass of sponges, means for agitating said mixed peas or beans and said sponges to clean said peas or beans and means for then separating said sponges from said peas or beans, means for receiving said separated sponges, means for cleaning said sponges, air blower means for forcibly returning said sponges to said stream of peas or beans for reuse and means for receiving said treated peas or beans.

EDWARD C. EBERTS.